No. 761,374. Patented May 31, 1904.

UNITED STATES PATENT OFFICE.

WILLIAM A. HALL, OF BELLOWS FALLS, VERMONT.

PAPER COATING OR ENAMELING COMPOSITION.

SPECIFICATION forming part of Letters Patent No. 761,374, dated May 31, 1904.

Application filed October 20, 1903. Serial No. 177,747. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Paper Coating or Enameling Compositions, of which the following is a specification.

Paper coating or enameling compositions are now largely made from alkaline solutions of casein and china-clay; but for the better class of work, and particularly on all wood papers, these casein compositions have proved too hard and have a tendency to resist ink, and this has compelled the use of animal-glue in place of casein, although glue is objectionable, owing to its dark color, odor, and cost. Many attempts have been made to produce softer paper-coating casein compositions by adding glycerin, waxes, and other softeners; but these substances, having no adhesiveness, have added to the cost without being essentially beneficial.

I have discovered that the objections to casein in paper coating or enameling compositions can be readily overcome by using it in connection with modified starches or other amylaceous substances, such as flour, and by "amylaceous substances" I mean those which have been rendered soluble and thin-flowing by treatment with acid or by oxidation. Now these modified amylaceous substances cannot be used as an adhesive in paper coating or enameling composition by themselves, as they are not sufficiently strong, are too soft, and will not produce a coating or an enameled surface on paper which will be suitable for lithographing or printing; but when used with casein an entirely different result is obtained. The casein being of a waterproof nature and very strong as an adhesive makes up the deficiency of the modified starch or other amylaceous substances in these respects, and the coatings produced are soft, pliable, and take the ink well. The proportions are immaterial and are governed by the class of goods which it is desired to produce. I have obtained the best results with from one-third to one-half of modified starch to two-thirds to one-half of casein for the adhesive, using of this adhesive in the coating or enameling composition about sixteen per cent. of an alkali or a substance with an alkaline reaction (preferably ammonia or borax) one and one-half per cent. of the entire coating composition, of an earthy or mineral base consisting of china-clay or substitute for the same (such as calcium or barium sulfate) eighty-two and one-half per cent., although I do not wish to limit myself to these exact proportions. Of course these ingredients are worked up in a sufficient amount of water to obtain a paint-like mass which will spread under the brush.

Previously to mixing the ingredients the casein is preferably dissolved in an alkaline solution, and the modified starch or other amylaceous substance is also preferably dissolved in hot or boiling water, and preferably five per cent. (of the weight of modified starch) of borax is added to the modified starch to make it gummy and prevent it becoming white and thick when cold. These materials may, however, be mixed before being dissolved. A mixture of these two solutions in the desired proportions is added while hot to the china-clay or other base, which has previously been worked into a creamy consistency or thick liquid mass in warm water. The completed mixture is run warm on the paper-coating machine and spread with brushes onto the surfaces of the papers.

Having thus described my invention, I claim and desire to secure by Letters Patent—

1. A paper coating or enameling composition consisting of casein, a modified amylaceous substance, and a base for which the mixture of casein and modified amylaceous substance serves as an adhesive or binder.

2. A paper coating or enameling composition consisting of casein, a modified starch and a base for which the mixture of casein and modified starch serves as an adhesive or binder.

3. A paper coating or enameling composition consisting of an alkaline solution of casein mixed with a solution of modified starch and china-clay, the clay having been worked up in water to a creamy consistency or thick liquid mass.

In testimony whereof I affix my signature in presence of two witnesses.

WILLIAM A. HALL.

Witnesses:
P. A. LANHAM,
P. S. WURTS.